(12) United States Patent
Sugaya

(10) Patent No.: US 11,335,044 B2
(45) Date of Patent: May 17, 2022

(54) DISPLAY SYSTEM OF A WEARABLE TERMINAL, DISPLAY METHOD OF THE WEARABLE TERMINAL, AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 16/623,133

(22) PCT Filed: Jun. 28, 2017

(86) PCT No.: PCT/JP2017/023815
§ 371 (c)(1),
(2) Date: Mar. 20, 2020

(87) PCT Pub. No.: WO2019/003360
PCT Pub. Date: Jan. 3, 2019

(65) Prior Publication Data
US 2020/0226806 A1 Jul. 16, 2020

(51) Int. Cl.
*G06F 3/01* (2006.01)
*G06T 11/60* (2006.01)
(Continued)

(52) U.S. Cl.
CPC .............. *G06T 11/60* (2013.01); *G06F 3/011* (2013.01); *G06V 40/10* (2022.01); *G06V 40/172* (2022.01); *G06T 2200/24* (2013.01)

(58) Field of Classification Search
CPC ...... G06T 11/60; G06T 2200/24; G06F 3/011; G06K 9/00288; G06K 9/00362; G06K 9/00671; G06V 40/10; G06V 40/172
See application file for complete search history.

(56) References Cited

U.S. PATENT DOCUMENTS 7,069,292 B2 * 6/2006 Sugahara ............ G06F 16/9535
709/203
8,963,807 B1 2/2015 Lee et al.
(Continued)

FOREIGN PATENT DOCUMENTS

JP 2002149478 A 5/2002
JP 2015057659 A 3/2015
(Continued)

OTHER PUBLICATIONS

International Search Report issued in PCT/JP2017/023815 dated Aug. 8, 2017.

*Primary Examiner* — Antonio A Caschera
(74) *Attorney, Agent, or Firm* — Norton Rose Fulbright US LLP; James R. Crawford

(57) ABSTRACT

A problem to be solved is to identify a person from an image of the visual field of a wearable terminal, and display personal information collected according to the person as augmented reality on a display board of the wearable terminal. Provided is a display system of a wearable terminal that displays personal information about a person on a display board of the wearable terminal, the display system of a wearable terminal including: an image acquisition unit for acquiring an image of a person who enters the visual field of the wearable terminal; an identification unit for identifying the person by performing image parsing on the image; a collection unit for collecting personal information about the person; and a personal information display unit for displaying the personal information about the person seen through the display board as augmented reality on the display board of the wearable terminal.

13 Claims, 1 Drawing Sheet

(51) Int. Cl.
*G06V 40/10* (2022.01)
*G06V 40/16* (2022.01)

(56) References Cited

U.S. PATENT DOCUMENTS

2013/0335321 A1* 12/2013 Sugita ............... G06F 3/011
 345/157
2016/0011421 A1 1/2016 Kim et al.
2017/0293480 A1* 10/2017 Wexler ............... H04L 67/34

FOREIGN PATENT DOCUMENTS

| JP | 2015153157 A | 8/2015 |
| JP | 2015210580 A | 11/2015 |
| JP | 2015210797 A | 11/2015 |
| JP | 2017049763 A | 3/2017 |

* cited by examiner

DISPLAY SYSTEM OF A WEARABLE TERMINAL, DISPLAY METHOD OF THE WEARABLE TERMINAL, AND PROGRAM

CROSS-REFERENCE TO RELATED APPLICATION

This application is a 371 of International Patent Application No. PCT/JP2017/023815 filed Jun. 28, 2017, which is incorporated herein by reference in its entirety.

TECHNICAL FIELD

The present disclosure relates to a display system of a wearable terminal, a display method of the wearable terminal and a program for displaying collected personal information about a person seen through the display board as augmented reality on a display board of a wearable terminal.

BACKGROUND

In recent years, the information technology (IT) for personal information has been developing. For example, a display device which provides necessary information for a person in front of a mirror at an appropriate timing in consideration of an installation position of the mirror is provided (Patent Document 1).

EXISTING ART DOCUMENT

Patent Document

Patent Document 1: Japanese Laid-open Publication No. 2015-210797

SUMMARY

Problem to be Solved by the Present Disclosure

The system of Patent Document 1 provides information to a person in front of a mirror, and has a problem that information about a third party cannot be provided.

In view of the above problem, the present disclosure aims to provide a display system of a wearable terminal, a display method of the wearable terminal and a program for identifying a person from an image of the visual field of the wearable terminal and displaying personal information collected according to the person as augmented reality on a display board of the wearable terminal.

Solution to the Problem

In the present disclosure, a solution as described below is provided.

According to the first feature of the present disclosure, a display system of a wearable terminal which is configured to display personal information about a person on a display board of a wearable terminal is provided. The display system of the wearable terminal includes: an image acquisition unit configured to acquire an image of a person entering a visual field of the wearable terminal, an identification unit configured to identifying the person by performing image parsing on the image, a collection unit configured to collect the personal information about the person, and a personal information display unit configured to for the person seen through the display board, display the personal information as augmented reality on the display board of the wearable terminal, display the person and the personal information in different display manners, and switch on/off the display of the personal information.

According to the first feature of the present disclosure, a display method of a wearable terminal which is configured to be executed by a display system of a wearable terminal for displaying personal information about a person on a display board of the wearable terminal is provided. The display method includes: an image acquisition step of acquiring an image of a person entering a visual field of the wearable terminal; an identification step of identify the person by performing image parsing on the image; a collection step of collecting the personal information about the person; and a personal information display step of for the person seen through the display board, displaying the personal information as augmented reality on the display board of the wearable terminal, displaying the person and the personal information in different display manners, and switching on/off the display of the personal information.

According to the first feature of the present disclosure, a non-transitory storage medium for storing a computer readable program, wherein the program is configured to, when executed by the computer, perform the following steps: an image acquisition step of acquiring an image of a person entering a visual field of the wearable terminal; an identification step of identifying the person by performing image parsing on the image; a collection step of collecting the personal information about the person; and a personal information display step of for the person seen through the display board, displaying the personal information as augmented reality on the display board of the wearable terminal, displaying the person and the personal information in different display manners, and switching on/off the display of the personal information.

The personal information about the person can be displayed on the display board of the wearable terminal merely by placing the person in the visual field of the wearable terminal.

DETAILED DESCRIPTION

Hereinafter, the best preferred embodiment of the present disclosure will be described. It should be noted that this is merely an example, and the technical scope of the present disclosure is not limited thereto.

The display system of a wearable terminal of the present disclosure is a system for displaying collected personal information about a person seen through the display board as augmented reality on a display board of a wearable terminal. A wearable terminal refers to a terminal having a visual field, such as smart glasses, a head mounted display, etc.

Figure 1:
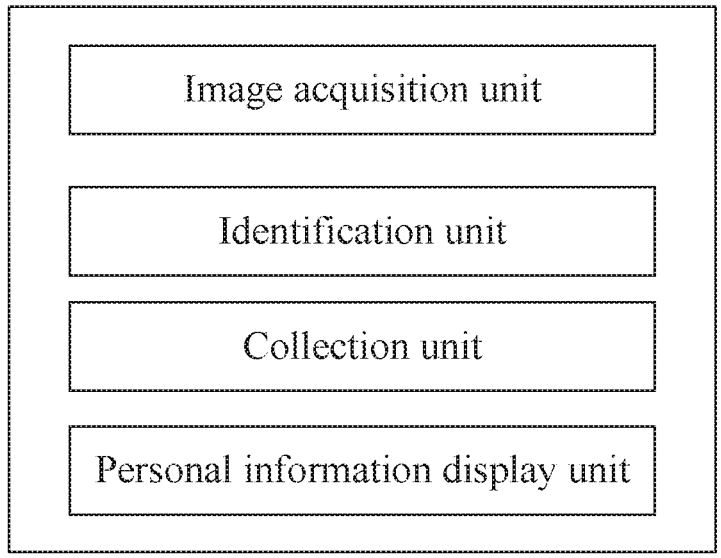
FIG. 1 is a schematic diagram of a display system of a wearable terminal.

A preferred embodiment of the present disclosure is described with reference to FIG. 1. FIG. 1 is a schematic diagram of a display system of a wearable terminal in the preferred embodiment of the present disclosure.

As shown in FIG. 1, the display system of a wearable terminal is provided with an image acquisition unit, an identification unit, a collection unit, and a personal information display unit, which are implemented by reading a prescribed program by a controller. In addition, although not shown, a determination unit, a change unit, a detection unit, an action result display unit, a position direction acquisition unit, a prediction unit, a guideline display unit, and a selection acceptance unit may also be provided. These may be of application-type, cloud-type, or other types. The various units described above may be implemented by an independent computer or by more than two computers (e.g., as in the case of servers and terminals).

The image acquisition unit acquires an image of a person entering the visual field of the wearable terminal, and may also acquire an image taken by the camera of the wearable terminal. Alternatively, it is OK even if it is other than the wearable terminal as long as the image as described above can be acquired. The image may be a dynamic image or a static image. In order to display the personal information in real time, a real-time image is preferable.

The identification unit identifies the person by performing image parsing on the image, for example, to identify whether the person is Taro Yamada, Hanako Sato, Ichiro Suzuki, or the like. A person may, but may not necessarily, be identified from color, shape, size, characteristics, etc. In addition, if it takes time to identify all of the captured persons, maybe only the person in the center of the visual field of the wearable terminal is identified. If only the person in the center of the visual field is identified, the time required for the identification can be greatly reduced. The accuracy of image parsing can also be improved through machine learning. For example, machine learning is performed by using a past image of a person as teacher data.

The collection unit collects personal information according to the person. Personal information refers to: name, gender, age, address, occupation, post, family member, etc, but is not limited thereto. The personal information according to the person may also be collected with reference to a database in which personal information is registered in advance, for example, be collected with reference to a database in which name card information or the like is registered. In addition, the personal information may also be collected by accessing Web content associated with a person in advance, for example, be collected from Web content by assigning a uniform resource locator (URL) or the like that associates a person with personal information. In addition, Internet retrieval may be performed on a person to collect personal information from the retrieved Web content. For example, a case where personal information is loaded on a home page or the like exists, and thus collection can be performed through Internet retrieval. Alternatively, sometimes personal information can be collected from social networking services (SNSs), review sites, and the like.

Figure 2:
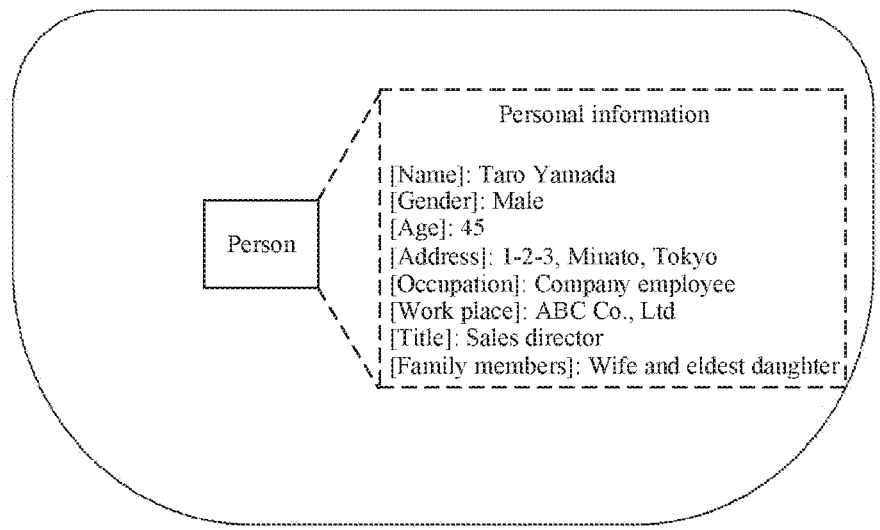
FIG. 2 is an example in which personal information about a person is collected and displayed on a display board of a wearable terminal.

For the person seen through the display board, the personal information display unit displays personal information as augmented reality on the display board of the wearable terminal. For example, as shown in FIG. 2, for the person seen through the display board and depicted by the solid line, the personal information depicted by the dashed line is displayed as augmented reality on the display board of the wearable terminal. For ease of understanding, the solid line is provided as a real object and the dashed line is provided as augmented reality. For the person seen through the display board and depicted by the solid line, the personal information is displayed as augmented reality. Therefore, it is possible to visually grasp what personal information the person has. Although the personal information displayed as the augmented reality may be displayed in a manner of overlapping the person seen through the display board, it becomes difficult to see the person, and therefore, it is also possible to switch ON/OFF the display of the personal information.

The determination unit determines whether the displayed personal information is browsed. Whether the personal information is browsed may be determined by acquiring the image in the browsing and performing image parsing. In addition, whether the personal information is browsed may also be determined based on the information about a sensor of the wearable terminal, information about the sensor worn on the browser, etc, for example, sensors include a sensor for sensing line of sight, a motion sensor, an acceleration sensor, and the like.

The change unit changes the personal information to a browsed state if the personal information is determined to have been browsed, and changes the degree of attention if the personal information is not determined to have been browsed so that the personal information is to be browsed. In this way, it is possible to visually grasp which personal information has or has not been browsed. For example, it may be determined that the browsing is completed by checking the checkbox of the personal information. For example, it may be determined that the browsing is completed by pressing a stamp on the personal information. In addition, the degree of attention may be changed by changing the color and size of the personal information or by pressing a stamp to make the personal information conspicuous.

The detection unit detects an action on the displayed personal information. The action is, for example, a gesture, movement of the hand, movement of the line of sight, etc. The image in browsing is acquired and subjected to image parsing, so that the action on the personal information can be detected. In addition, the action on the personal information may also be detected according to information about a sensor of the wearable terminal, information about the sensor worn on the browser, etc, for example, sensors include a sensor for sensing line of sight, a motion sensor, an acceleration sensor, etc.

For the person seen through the display board, the action result display unit displays the result according to the action as augmented reality on a display board of the wearable terminal. For example, if an action of canceling the personal information is detected, the display of the personal information is canceled. For example, if an action of opening the link attached to personal information is detected, the link is opened. For example, if an action of opening the page of the personal information is detected, the page is opened. Other actions are of course possible.

The position direction unit acquires a terminal position and a capturing direction of the wearable terminal. For example, the terminal position can be acquired from a global positioning system (GPS) of the wearable terminal. For example, in the case of capturing through the wearable terminal, the capturing direction can be acquired from the geomagnetic sensor and the acceleration sensor of the wearable terminal. Acquisition may also be performed in other manners.

The prediction unit predicts the person position of the person based on the terminal position and the capturing direction. If the terminal position and the capturing direction are known, the person position of the captured person can be predicted.

Further, the identification unit may identify the person according to the position of the person and the image parsing. The identification accuracy can be improved by using the position information. For example, if the accuracy of identifying the person as Taro Yamada through the position information can be improved, the reliability of the displayed personal information is also improved correspondingly.

The guideline display unit displays a guideline for capturing a person as augmented reality on a display board of a wearable terminal. For example, a guideline such as a frame and a cross may be displayed. Image parsing is facilitated with capturing along the guideline.

In addition, the acquisition unit may acquire an image taken along the guideline. A person can be efficiently identified by acquiring only the image taken along the guideline for image parsing.

The selection acceptance unit accepts the selection of a selection target about persons seen through the display board of the wearable terminal. For example, the selection of the selection target may be accepted through observation on a person seen through the display board of the wearable terminal for a certain time. For example, the selection of the selection target may also be accepted by touching a person seen through the display board of the wearable terminal. For example, the selection of the selection target may also be accepted by causing a cursor to be aligned with a person seen through the display board of the wearable terminal. For example, sensors include a sensor for sensing line of sight, a motion sensor, an acceleration sensor, etc.

In addition, it is also possible that the personal information display unit only displays the personal information matched with the selection target seen through the display board as augmented reality on the display board of the wearable terminal. Only the personal information matched with the selection target seen through the display board is displayed as augmented reality, so the personal information can be grasped at a pinpoint. When personal information about all identified persons is displayed, the screen of the display board sometimes becomes cumbersome.

Description of Operation

A display method of a wearable terminal is described below. The display method of the wearable terminal of the present disclosure is a method for displaying collected personal information about a person seen through the display board as augmented reality on a display board of a wearable terminal.

The display method includes an image acquisition step, an identification step, a collection step, and a personal information display step. In addition, although not shown, a determination step, a change step, a detection step, an action result display step, a position direction acquisition step, a prediction step, a guideline display step, and a selection acceptance step may also be provided.

In the image acquisition step, an image of a person entering the visual field of the wearable terminal is acquired. An image taken by the camera of the wearable terminal may also be acquired. Alternatively, it is OK even if it is other than the wearable terminal as long as the image as described above can be acquired. The image may be a dynamic image or a static image. In order to display the personal information in real time, a real-time image is preferable.

In the identification step, image parsing is performed on the image to identify the person, for example, to identify whether the person is Taro Yamada, Hanako Sato, Ichiro Suzuki, or the like. A person may, but may not necessarily, be identified from color, shape, size, characteristics, etc. In addition, if it takes time to identify all of the captured persons, maybe only the person in the center of the visual field of the wearable terminal is identified. If only the person in the center of the visual field is identified, the time required for the identification can be greatly reduced. The accuracy of image parsing can also be improved through machine learning. For example, machine learning is performed by using a past image of a person as teacher data.

In the collection step, personal information according to the person is collected. Personal information refers to: name, gender, age, address, occupation, post, family member, etc, but is not limited thereto. The personal information according to the person may also be collected with reference to a database in which personal information is registered in advance, for example, be collected with reference to a database in which name card information or the like is registered. In addition, the personal information may also be collected by accessing Web content associated with a person in advance, for example, be collected from Web content by assigning a uniform resource locator (URL) or the like that associates a person with personal information. In addition, Internet retrieval may be performed on a person to collect personal information from the retrieved Web content. For example, a case where personal information is loaded on a home page or the like exists, and thus collection can be performed through Internet retrieval. Alternatively, sometimes personal information can be collected from social networking services (SNSs), review sites, and the like.

In the personal information display step, for the person seen through the display board, personal information is displayed as augmented reality on the display board of the wearable terminal. For example, as shown in FIG. 2, for the person seen through the display board and depicted by the solid line, the personal information depicted by the dashed line is displayed as augmented reality on the display board of the wearable terminal. For ease of understanding, the solid line is provided as a real object and the dashed line is provided as augmented reality. For the person seen through the display board and depicted by the solid line, the personal information is displayed as augmented reality. Therefore, it is possible to visually grasp what personal information the person has. Although the personal information displayed as the augmented reality may be displayed in a manner of overlapping the person seen through the display board, it becomes difficult to see the person, and therefore, it is also possible to switch ON/OFF the display of the personal information.

In the determination step, it is determined whether the displayed personal information is browsed. Whether the personal information is browsed may be determined by acquiring the image in the browsing and performing image parsing. In addition, whether the personal information is browsed may also be determined based on the information about a sensor of the wearable terminal, information about the sensor worn on the browser, etc, for example, sensors include a sensor for sensing line of sight, a motion sensor, an acceleration sensor, and the like.

In the change step, the personal information is changed to a browsed state if the personal information is determined to have been browsed, and the degree of attention is changed if the personal information is not determined to have been browsed so that the personal information is to be browsed. In this way, it is possible to visually grasp which personal information has or has not been browsed. For example, it may be determined that the browsing is completed by checking the checkbox of the personal information. For example, it may be determined that the browsing is completed by pressing a stamp on the personal information. In addition, the degree of attention may be changed by changing the color and size of the personal information or by pressing a stamp to make the personal information conspicuous.

In the detection step, an action on the displayed personal information is detected. The action is, for example, a gesture, movement of the hand, movement of the line of sight, etc. The image in browsing is acquired and subjected to image parsing, so that the action on the personal information can be detected. In addition, the action on the personal information may also be detected according to information about a sensor of the wearable terminal, information about the sensor worn on the browser, etc, for example, sensors include a sensor for sensing line of sight, a motion sensor, an acceleration sensor, etc.

In the action result display step, for the person seen through the display board the result according to the action is displayed as augmented reality on a display board of the wearable terminal. For example, if an action of canceling the personal information is detected, the display of the personal information is canceled. For example, if an action of opening the link attached to personal information is detected, the link is opened. For example, if an action of opening the page of the personal information is detected, the page is opened. Other actions are of course possible.

In the position direction step, a terminal position and a capturing direction of the wearable terminal are acquired. For example, the terminal position can be acquired from a global positioning system (GPS) of the wearable terminal. For example, in the case of capturing through the wearable terminal, the capturing direction can be acquired from the geomagnetic sensor and the acceleration sensor of the wearable terminal. Acquisition may also be performed in other manners.

In the prediction step, the person position of a person is predicted based on the terminal position and the capturing direction. If the terminal position and the capturing direction are known, the person position of the captured person can be predicted.

In addition, in the identification step, the person may be identified according to the position of the person and the image parsing. The identification accuracy can be improved by using the position information. For example, if the accuracy of identifying the person as Taro Yamada through the position information can be improved, the reliability of the displayed personal information is also improved correspondingly.

In the guideline display step, a guideline for capturing a person is displayed as augmented reality on a display board of a wearable terminal. For example, a guideline such as a frame and a cross may be displayed. Image parsing is facilitated with capturing along the guideline.

In addition, in the acquisition step, an image taken along the guideline may be acquired. A person can be efficiently identified by acquiring only the image taken along the guideline for image parsing.

In the selection acceptance step, the selection of a selection target about persons seen through the display board of the wearable terminal is accepted. For example, the selection of the selection target may be accepted through observation on a person seen through the display board of the wearable terminal for a certain time. For example, the selection of the selection target may also be accepted by touching a person seen through the display board of the wearable terminal. For example, the selection of the selection target may also be accepted by causing a cursor to be aligned with a person seen through the display board of the wearable terminal. For example, sensors include a sensor for sensing line of sight, a motion sensor, an acceleration sensor, etc.

In addition, it is also possible that in the personal information display step, only the personal information matched with the selection target seen through the display board is displayed as augmented reality on the display board of the wearable terminal. Only the personal information matched with the selection target seen through the display board is displayed as augmented reality, so the personal information can be grasped at a pinpoint. When personal information about all identified persons is displayed, the screen of the display board sometimes becomes cumbersome.

The above-mentioned units and functions are implemented by a computer (including a central processing unit (CPU), an information processing apparatus, and various terminals) reading and executing a prescribed program. The program may be, for example, an application installed in the computer or may be provided in a form of Software as a Service (SaaS) provided from the computer via a network, for example, in the form of a computer-readable recording medium recorded on a floppy disk, a Compact Disc (CD) (CD-Read Only Memory (CD-ROM), etc.), a Digital Versatile Disc (DVD) (DVD-ROM, DVD-Random Access Memory (DVD-RAM), etc.), etc. In this case, the computer reads the program from its recording medium, transmits the program to an internal storage apparatus or an external storage apparatus for storage and execution. Further, the program may also be pre-recorded, for example, on a storage apparatus (recording medium) such as a magnetic disk, an optical disk, a magneto-optical disk, or the like, and is supplied from the storage apparatus to the computer via a communication line.

As the specific algorithm of the above-mentioned machine learning, a nearest neighbor method, a Naive Bayes method, a decision tree, a support vector machine, and reinforcement learning may be used. Moreover, the algorithm may also be deep learning which generates a feature quantity for learning by itself through using a neural network.

The embodiments of the present disclosure have been described above, but the present disclosure is not limited to the above-mentioned embodiments. In addition, the effects described in the embodiments of the present disclosure are merely illustrative of the best effects produced by the present disclosure, and the effects of the present disclosure are not limited to the effects described in the embodiments of the present disclosure.

What is claimed is:

1. A display system of a wearable terminal, which is configured to display personal information about a person on a display board of a wearable terminal, comprising:
    an image acquisition unit, configured to acquire an image of a person entering a visual field of the wearable terminal;
    an identification unit, configured to identify the person by performing an image parsing on the image according to at least one of a color, a shape, a size, or a characteristic, wherein the identification unit is further configured to perform machine learning to improve accuracy of the image parsing;
    a collection unit, configured to collect the personal information about the person;
    a personal information display unit, configured to, for the person seen through the display board, display the personal information as augmented reality on the display board of the wearable terminal and switch on or off the display of the personal information; and a guideline display unit, configured to display a guideline as augmented reality on the display board of the wearable terminal, wherein the guideline is used for capture of a current image showing the person;

wherein the image acquisition unit is further configured to acquire the image captured along the guideline;

wherein the display system further comprises:

a detection unit, configured to detect an action on the displayed personal information; and an action result display unit, configured to, according to the action performed on the personal information seen through the display board, display a result as augmented reality on the display board of the wearable terminal, wherein the action comprises a movement of a hand, a gesture, or a movement of a line of sight;

wherein the action is detected based on parsed images, and the parsed images are obtained by parsing images collected in a browsing process.

2. The display system of claim 1, wherein
the identification unit is configured to only identify a person located in a center of the visual field of the wearable terminal.

3. The display system of claim 1, wherein
the collection unit is configured to collect the personal information about the person with reference to a database in which personal information is registered.

4. The display system of claim 1, wherein
the collection unit is configured to collect the personal information by accessing Web content associated with the person.

5. The display system of claim 1, wherein
the collection unit is configured to perform Internet retrieval of the person to collect the personal information from retrieved Web content.

6. The display system of claim 1, further comprising:
a determination unit, configured to determine whether the displayed personal information is browsed; and
a change unit, configured to change the personal information to a browsed state in response to determining that the personal information is browsed.

7. The display system of claim 1, further comprising:
a determination unit, configured to determine whether the displayed personal information is browsed; and
a change unit, configured to change a degree of attention in response to determining that the personal information is not browsed, so that the personal information is to be browsed.

8. The display system of claim 1, further comprising:
a position direction acquisition unit, configured to acquire a terminal position and a capturing direction of the wearable terminal; and
a prediction unit, configured to predict a person position of the person based on the terminal position and the capturing direction;
wherein the identification unit is configured to identify the person according to the person position and the image parsing.

9. The display system of claim 1, further comprising:
a selection acceptance unit, configured to accept a selection of a selection target on the person seen through the display board of the wearable terminal;
wherein the personal information display unit is configured to display personal information, which is only matched with the selection target seen through the display board, as augmented reality on the display board of the wearable terminal.

10. The display system of claim 1, wherein the action is detected based on at least one of information collected by a sensor of the wearable terminal or information collected by a wearable sensor, and each of the sensor of the wearable terminal and the wearable sensor is a sensor for sensing a line of sight, a motion sensor, or an acceleration sensor.

11. The display system of claim 1, wherein the action result display unit is further configured to, in response to detecting an action of canceling the personal information, cancel display of the personal information; in response to detecting an action of opening a link attached in the personal information, open the link; or in response to detecting an action of opening a page of the personal information, open the page.

12. A display method of a wearable terminal, configured to be implemented by a display system of a wearable terminal for displaying personal information about a person on a display board of the wearable terminal, comprising:

an image acquisition step: acquiring an image of a person entering a visual field of the wearable terminal;

an identification step: identifying the person by performing image parsing on the image according to at least one of a color, a shape, a size, or a characteristic, wherein the identification step further comprises performing machine learning to improve accuracy of the image parsing;

a collection step: collecting the personal information about the person; and a personal information display step: for the person seen through the display board, displaying the personal information as augmented reality on the display board of the wearable terminal, and switching on or off the display of the personal information; and a guideline display step: displaying a guideline as augmented reality on the display board of the wearable terminal, wherein the guideline is used for capture of a current image showing the person;

wherein in the image acquisition step, the method further comprises acquiring the image captured along the guideline;

wherein the display method further comprises:

detecting an action on the displayed personal information; and displaying, according to the action performed on the personal information seen through the display board, a result as augmented reality on the display board of the wearable terminal, wherein the action comprises a movement of a hand, a gesture, or a movement of a line of sight;

wherein the action is detected based on parsed images, and the parsed images are obtained by parsing images collected in a browsing process.

13. A non-transitory storage medium, storing a computer readable program, wherein the program, when executed by a processor, causes the processor to perform the following steps:

an image acquisition step: acquiring an image of a person entering a visual field of a wearable terminal;

an identification step: identifying the person by performing image parsing on the image according to at least one of a color, a shape, a size, or a characteristic, wherein the identification step further comprises performing machine learning to improve accuracy of the image parsing;

a collection step: collecting the personal information about the person; and a personal information display step: for the person seen through the display board, displaying the personal information as augmented reality on the display board of the wearable terminal, and switching on or off the display of the personal information; and a guideline display step: displaying a guideline as augmented reality on the display board of the wearable terminal, wherein the guideline is used for capture of a current image showing the person;

wherein in the image acquisition step, the method further comprises acquiring the image captured along the guideline;

wherein the program, when executed by the processor, further causes the processor to perform the following steps:

detecting an action on the displayed personal information; and displaying, according to the action performed on the personal information seen through the display board, a result as augmented reality on the display board of the wearable terminal, wherein the action comprises a movement of a hand, a gesture, or a movement of a line of sight;

wherein the action is detected based on parsed images, and the parsed images are obtained by parsing images collected in a browsing process.

\* \* \* \* \*